UNITED STATES PATENT OFFICE.

WILLIAM T. LEATHERS, OF MOUNT EAGLE, PENNSYLVANIA.

ROOFING-PAINT.

SPECIFICATION forming part of Letters Patent No. 542,086, dated July 2, 1895.

Application filed March 8, 1894. Serial No. 502,893. (No specimens.)

*To all whom it may concern:*

Be it known that I, WILLIAM T. LEATHERS, a citizen of the United States, residing at Mount Eagle, in the county of Centre and State of Pennsylvania, have invented certain new and useful Improvements in Paint for Painting Roofs of Various Materials; and I do declare the following to be a full, clear, and exact description of the invention, such as will enable others skilled in the art to which it appertains to make and use the same.

This improved composition of matter or compound is designed for use in painting roofs of various materials, such as shingles, or tin roofs, or roofs of other materials that will take a coating of composition paint, or what is commonly termed "metallic paint" or "iron-clad paint."

My composition for forming such a paint consists of gasoline, five (5) gallons; gas-tar, ten (10) gallons; iron, (powdered,) one (1) pound; asphalt, one-fourth ($\frac{1}{4}$) pound; patent drier, one (1) pound. The patent drier consists of one part of japan drier, one part of litharge, one part of benzine, and three parts of turpentine. These ingredients I place in a wooden vessel of appropriate or convenient size, first placing the gas-tar therein, then pouring the gasoline into the vessel, and then placing the other remaining ingredients in the vessel. I then mix the whole batch well and thoroughly together in a warm room, or, where it is not too cold, the mixing may be done in the open air.

When the composition has become sufficiently cool, it is ready for application to the roof or other place to be coated with the paint, and this application is performed by a person using a brush, as ordinarily used in such cases, and should be done in clear weather in order that the paint may be subjected to the action of the sun to cause it to take hold.

In applying this composition to a roof or the like surface care should be taken that the roof be not wet or frozen on the surface to which the paint is to be applied, as in these conditions the paint will not adhere so readily or so well.

Having thus fully described my invention, what I claim, and desire to secure by Letters Patent, is—

A paint compound consisting of gasolene, gas tar, asphalt, patent drier and powdered iron combined in substantially the proportions set forth.

In testimony whereof I affix my signature in presence of two witnesses.

WM. T. LEATHERS.

Witnesses:
J. K. LEATHERS,
H. W. BICKLE.